United States Patent Office 3,111,539
Patented Nov. 19, 1963

3,111,539
O-(2-ISOPROPOXYPHENYL)-N-METHYL AND -N,N-DIMETHYLCARBAMATE
Ernst Böcker, Cologne-Stammheim, Detlef Delfs and Günter Unterstenhöfer, Opladen, and Wolfgang Behrenz, Wuppertal-Elberfeld, Germany, assignors to Farbenfabriken Bayer Aktiengesellschaft, Leverkusen, Germany, a corporation of Germany
No Drawing. Filed July 19, 1960, Ser. No. 43,728
Claims priority, application Germany July 31, 1959
2 Claims. (Cl. 260—479)

The present invention relates to and has as its objects new and useful insecticidal agents and processes for their production. Generally the new compounds of this invention may be represented by the following formula

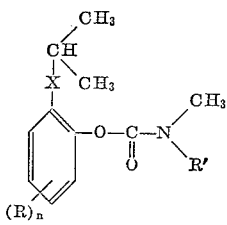

wherein R stands for low molecular weight alkyl radicals or halogen, R' stands for hydrogen or methyl, $n$ for zero or a whole number from 1 to 3 and X for oxygen or a $CH_2$ group or, if R' stands for a methyl group, also for a direct bond between the CH group and the aromatic radical.

N-mono- and N,N-dimethylcarbamates of naphthols, chiefly of α-naphthol, are known to possess an insecticidal activity. Their toxicity in warm blood animals is relatively low (see e.g. Contribution from Boyce Thompson Institute vol. 18, No. 11, 1957 and German specification 1,037,195). It is further known that carbamates of phenol and some of its nuclear-substituted derivatives have an insecticidal activity chiefly against common flies. It is also known that some of the aforesaid compounds show a synergistic activity in mixtures with other insecticides (cf. German specifications Nos. 956,638; 962,124 and 964,818). Finally, a great number of alkyl-phenyl-N-methyl-carbamates are described in a comprehensive report on the insecticidal activity of carbamates with regard to the inhibition of cholinesterasies (cf. Agricultural and Food Chemistry, vol. 2, No. 17, pp. 864–870), their activity against common flies and thrips being specially emphasized.

It has now been found that new highly active pest control agents are obtainable by reacting phenols of the general formula

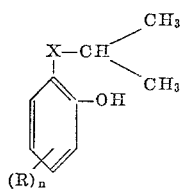

with methylcarbamic acid chloride or methyl-isocyanate or dimethylcarbamic acid chloride, or by reacting chloroformic acid esters of the phenols given in the above formula with methyl- or dimethylamine. In the above formula, R stands for low molecular weight alkyl radicals or halogen, $n$ for zero or a whole number from 1 to 3 and X for oxygen or a $CH_2$ group; in the case of a reaction with dimethylcarbamic acid chloride or of the chloroformic acid ester with dimethylamine X may moreover stand for a direct bond between the CH group and the aromatic radical.

The process of the invention is preferably carried out in a solvent such as dioxan or pyridine. Working up may be effected by conventional methods.

The compounds obtained according to the invention are a new highly active class of pest control agents, particularly for combating sucking or biting (eating) insects. Carbamates having a satisfactory activity against ectoparasites have hitherto not been known. It was therefore surprising that the compounds obtainable according to the invention possess an outstanding activity against insects and spiders living ectoparasitically, particularly against ticks and parasitic fly larvae. In addition to a low toxicity in mammals, the compounds are partly distinguished by an extremely rapid lethal action on the parasites, for example ticks and blowfly larvae, which could not be achieved with the hitherto known compounds. The new carbamates may therefore be used with advantage for combating ecto-parasites in combination with other preparations the action of which is less rapid but more persistent. They are applied in conventional manner, i.e. in a suspension or emulsion with the use of the usual extenders and diluents such as aqueous suspensions or emulsions containing for example acetone or dimethylformamide and/or possibly emulsifiers or talcum or kaolin.

The following examples are given for the purpose of illustrating the invention.

EXAMPLE 1

(a) O - (2 - isopropoxyphenyl)-N-Methyl Carbamate. 23.25 grams of o-isopropoxyphenol (0.15 mol) are treated in 15 ml. of anhydrous dioxan with 8.63 grams of methylisocyanate (0.152 mol) and 2 drops of triethylamine as catalyst. The solutions become warm soon and upon cooling the product precipitates as a colorless crystalline substance. In order to complete the precipitation, the reaction mixture is stirred with 50 ml. of petroleum ether. The crystalline product is filtered off, washed with ligroin and with water, in order to remove any urea by-products, and dried at 50° C. in a vacuum. After re-crystallization from benzene the product melts at 91° C. Yield: 26.3 grams, corresponding to 84% of the theoretical.

(b) Fully sucked female ticks of the species *Rhipicephalus evertsi* are immersed in a suspension or emulsion of O-(2-isopropoxyphenyl)-N-methyl-carbamate at various concentrations for 1 minute and then placed on dry filter paper. Already after 3 hours, all ticks are damaged 100% even by concentrations of active substance as low as 0.025%, whilst by a commercial control preparation at the same concentration the ticks were damaged 100% only after more than 60 hours.

(c) Cattle which are infested by adult ticks of the species *Boophilus microplus* in various stages of sucking-full are sprayed with a suspension or emulsion of O-(2-isopropoxyphenyl)-N-methylcarbamate at various concentrations. Even at a concentration of 0.025% of active substance all ticks are strongly damaged and fall off already 2½ hours after spraying, whilst in the case of control sprayings with commercial preparations the effect on the ticks starts only after 10 hours.

(d) Flesh wounds of sheep in which fly larvae of the species *Chrysomyia chloropyga* and *Lucilia sericata* parasitize are treated with O-(2-isopropoxyphenyl)-N-methylcarbamate in an aqueous or oily formulation. The larvae are killed 100% even at concentrations of 3 p.p.m. and the wounds can heal again.

EXAMPLE 2

*O-(2-Isopropoxyphenyl)-N,N-Dimethylcarbamate*

22.8 grams of 2-isopropoxyphenol (0.15 mol) are dissolved in 50 ml. of pyridine and boiled on a reflux condenser with 17.8 grams of dimethyl-carbamic acid chloride (0.165 mol) for 2 hours. After cooling, the reaction mixture is extracted with about 200 ml. of water to remove the pyridinium hydrochloride and, after treating with some methylene chloride for removal of unreacted phenol, shaken 5 times with 20 ml.-portions of sodium hydroxide solution. The organic layer is then washed, dried and distilled fractionally. The product is obtained as colorless oil of B.P. 130° C./2.5 mm. Hg. Yield: 20.4 grams corresponding to 61.8% of the theoretical.

By the same way there may be obtained the following compounds:

O-(2-isopropoxy-4-chloro-phenyl)-N,N-dimethylcarbamate

O-(2-isopropoxy-4,6-dichloro-phenyl)-N,N-dimethylcarbamate.

EXAMPLE 3

O-(2-Isobutylphenyl)-N-Methylcarbamate 22.5 grams of 2-isobutylphenol (0.15 mol) are treated in 9 ml. of anhydrous dioxan with 9.4 grams of methylisocyanate (0.165 mol) and 2 drops of triethylamine. After standing for 20 hours, the reaction mixture is treated with 50 ml. of petroleum ether. The precipitated colorless crystalline product is filtered, washed with petroleum ether and, to remove any urea by-products formed, subsequently with water. After drying, it is re-crystallized from ligroin. M.P. 70° C. Yield: 27.6 grams corresponding to 89% of the theoretical.

By the same way there may be obtained the following compound:

O-(2-Isobutyl-4-chloro-phenyl)-N-methylcarbamate.

EXAMPLE 4

O-(2-Isobutylphenyl)-N,N-Dimethylcarbamate 22.5 grams of 2-isobutylphenol (0.15 mol) are boiled on a reflux condenser with 17.8 grams of dimethyl-carbamic acid chloride and 50 ml. of pyridine for 5 hours. Working up is carried out as described in Example 2. The product boils at 83–84° C./0.1 mm. Hg. Yield: 12.1 grams corresponding to 36.6% of the theoretical.

EXAMPLE 5

O-(2-Isopropylphenyl)-N,N-Dimethylcarbamate 99.3 grams of 2-isopropylphenyl-chloroformic acid ester (0.5 mol) are dissolved in 100 ml. of benzene and treated at 0° C. with 100 grams of a 46.8% aqueous dimethylamine solution (1.04 mol). After further stirring for 3 hours, the aqueous layer is separated from the organic layer. The organic layer is washed with distilled water, dried over sodium sulfate and distilled. After distilling off the solvent, the product is obtained as a pale oily liquid. B.P. 88° C./0.2 mm. Hg. Yield: 78 grams corresponding to 76% of the theoretical.

EXAMPLE 6

O-(2-Isopropyl-5-Methylphenyl)-N,N-Dimethylcarbamate 22.5 grams of 2-isopropyl-5-methylphenol (0.15 mol) are boiled on a reflux condenser with 17.8 grams of dimethylcarbamic acid chloride (0.165 mol) in 50 ml. of pyridine for 5 hours. Working up is carried out as described in Example 2. The product distils over at 83–84° C. in a vacuum of 0.05 mm. Hg. Yield: 19.8 grams corresponding to 59.7% of the theoretical.

EXAMPLE 7

Caterpillars of *Plutella maculipennis* are sprayed with a 0.02% solution of the O-(2-isopropoxyphenyl)-N-methylcarbamate obtained according to Example 1(a), the white cabbage leaves infested by the caterpillars being sprayed until dew-moist. The solutions are prepared by a preliminary mixing of the O-(2-isopropoxyphenyl)-N-methyl-carbamate in dimethylformamide with an addition of nonylphenol an emulsifier, and by subsequently diluting this preliminary mixture with water to the above mentioned concentration. The caterpillars are killed 100% within 24 hours.

EXAMPLE 8

Beans which are strongly infested by aphids (*Doralis fabae*) are sprayed as described in Example 7 with solutions of the active substances until dew-moist. After 24 hours the destruction is as follows:

(a) O-(2-isopropylphenyl)-N,N-dimethylcarbamate or O-(2-isopropoxyphenyl)-N,N-dimethylcarbamate—

| Pests | Percent solution of active substance | Destroyed, percent |
|---|---|---|
| Aphids | 0.2 | 100 |

(b) O-(2-isopropoxyphenyl)-N-methylcarbamate—

| Pests | Percent solutions of active substance | Destroyed, percent |
|---|---|---|
| Aphids | 0.2 / 0.02 | 100 / 90 |

We claim:
1. O-(2-isopropoxyphenyl)-N-methyl-carbamate.
2. O-(2-isopropoxyphenyl)-N,N-dimethylcarbamate.

References Cited in the file of this patent
UNITED STATES PATENTS

| | | |
|---|---|---|
| 2,776,197 | Gysin et al. | Jan. 1, 1957 |
| 2,904,557 | Wheeler et al. | Sept. 15, 1959 |
| 2,933,383 | Lambrech | Apr. 19, 1960 |

OTHER REFERENCES

Kolbezen et al.: J. Agr. and Food Chem., vol. 2, pp. 864–70, 1954.